Figure 1:
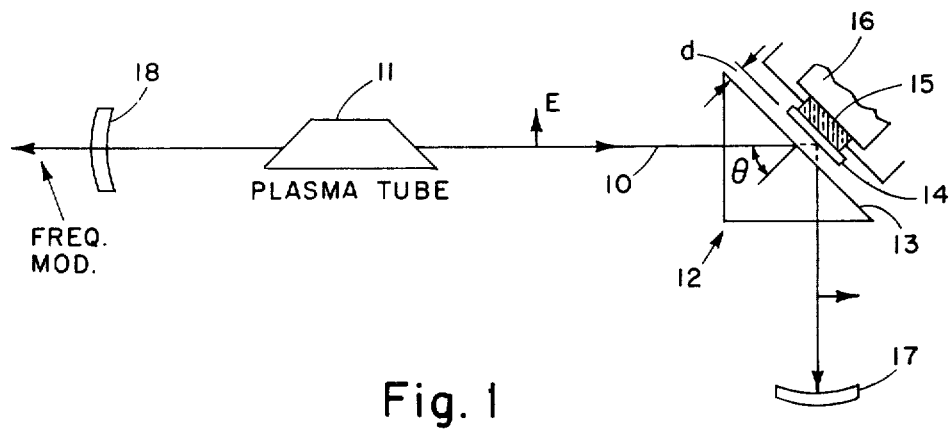

United States Patent [19]  
White

[11] 3,940,712  
[45] Feb. 24, 1976

[54] MODULATION TECHNIQUES FOR LASERS

[76] Inventor: Matthew B. White, 258 Forest Ave., Cohasset, Mass. 02025

[22] Filed: Apr. 11, 1974

[21] Appl. No.: 460,245

[52] U.S. Cl. .......................................... 331/94.5 M
[51] Int. Cl.² ........................................... H01S 3/10
[58] Field of Search .................. 331/94.5; 356/112; 350/285

[56] References Cited
UNITED STATES PATENTS

| | | | |
|---|---|---|---|
| 3,307,897 | 3/1967 | Lohmann | 350/161 |
| 3,517,327 | 6/1970 | Treuthart | 331/94.5 C |
| 3,697,888 | 10/1972 | Danielmeyer | 331/94.5 C |

Primary Examiner—William L. Sikes  
Attorney, Agent, or Firm—R. S. Sciascia; L. I. Shrago; C. E. Vautrain, Jr.

[57] ABSTRACT

An arrangement for frequency modulating a laser beam utilizes an optical prism which is disposed within the laser cavity such that the beam continuously experiences total internal reflection from one face thereof as an optical element having an index of refraction which is less than that of the prism is displaced so as to come in contact with this face and/or move variable distances therefrom. The external optical path of the beam, which exists beyond this face during total internal reflection is, thus, changed. This corrresponds to an effective change in the dimensions of the laser cavity and an appropriate shift in the frequency of the laser output beam. Amplitude modulation of the beam can also be achieved by placing the above components outside of the cavity and changing the direction of polarization of the beam entering the optical prism.

9 Claims, 3 Drawing Figures

U.S. Patent   Feb. 24, 1976   3,940,712

MODULATION TECHNIQUES FOR LASERS

The invention described herein may be manufactured and used by or for the Government of the United States of America for governmental purposes without the payment of any royalties thereon or therefor.

The present invention relates generally to optical modulation systems and, more particularly, to apparatus for and methods of phase or frequency modulating optical beams.

There are a variety of internal modulation techniques for accomplishing amplitude or frequency modulation of laser beams. For example, one arrangement involves positioning a suitable electro-optical crystal within the laser resonator and applying an appropriate voltage to this crystal so as to sweep or shift the frequency of the beam. Another approach varies the cavity dimensions by displacing one of the end mirrors by a piezo electric member. This technique cannot simultaneously achieve wide frequency excursions and fast rates of modulation because of the large mechanical displacements involved.

One type of external arrangement which has been utilized in the past to accomplish amplitude modulation of a laser beam utilizes frustrated total reflection at a prism-air interface. More particularly, a frustrating element made of a material having an index of refraction which is equal to or greater than that of the prism is disposed adjacent the slant surface of the prism and is moved in and out of contact with this surface in accordance with a modulation scheme. When the frustrating element is in optical contact with the prism, all of the incident light passes through the interface and is, thereafter, either absorbed or transmitted. However, as this element is gradually moved away from this contact, greater amounts of the incident light are internally reflected from the interface until substantially all of the light is so affected. Consequently, if the frustrating element is driven by a transducer so as to achieve the above type of cyclical displacement, the light beam emerging from the prism will have its amplitude correspondingly modulated.

The present invention employs this general arrangement of components. However, the indices of refraction of the prism and the frustrating element and the angle of incidence of the light beam on the interface are selected so that total internal reflection occurs at all times. In this connection, while the index of refraction of the frustrating element in the amplitude modulation device must be equal to or greater than that of the prism to permit unimpeded light transmission at the point of optical contact of the members in the modulation cycle, no such transmission is permitted in the present invention. More specifically, the present invention requires total internal reflection at the interface both when an optical element which is the counterpart of the frustrating element in the prior art amplitude modulating apparatus is in contact with the prism and when it is removed therefrom. To realize this mode of operation, the index of refraction of the optical element, $n_f$, is selected so as to be less than the index of refraction of the prism, $n_p$, and the angle of incidence, $\theta$, is arranged to satisfy the following relationships, namely, $$\theta > \sin^{-1} \frac{n_f}{n_p}$$

and $$\theta > \sin^{-1} \frac{1}{n_p}.$$

When these conditions are observed, the amplitude of the output beam remains constant as the optical element is cyclically displaced from the interface. However, depending upon the direction of polarization of the incident beam, a selected component or components thereof experience phase changes which may, for example, produce a phase or frequency modulated output beam or a polarization modulated beam which may be, thereafter, processed to give an amplitude modulated beam.

In the present invention, the optical element need only be moved over an extremely short distance. Thus, the modulator drive power required for a particular amount of frequency excursion is correspondingly less than that, for example, needed when the laser cavity mirrors are shifted. Additionally, since no radiation is absorbed by or transmitted through the optical element, this element may be made comparatively small so as to maximize the bandwidth capabilities of the system.

It is, accordingly, a primary object of the present invention to provide an arrangement for phase modulating optical beams.

Another object of the present invention is to phase or frequency modulate a light beam by utilizing the phenomonon of the total internal reflection.

Another object of the present invention is to provide an external method of phase modulating a light beam wherein a minimum of energy loss occurs.

Another object of the present invention is to achieve phase or frequency modulation of a light beam wherein an optical element moves in the external optical path of a light beam that is totally internally reflected from an optical surface.

Figure 3:
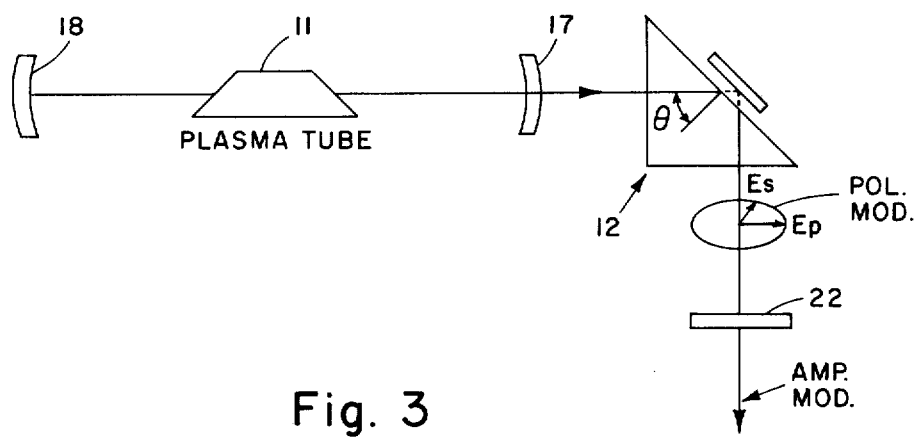
Figure 2:
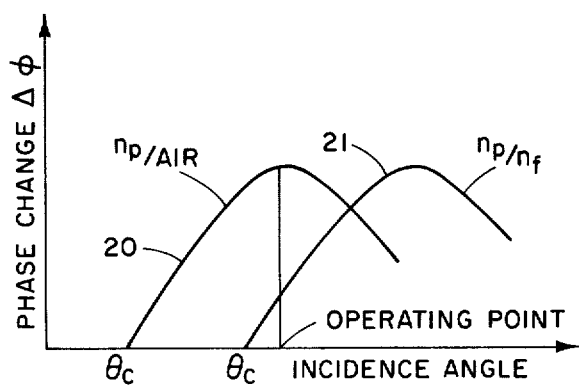

Other objects, advantages and novel features of the invention will become apparent from the following detailed description of the invention when considered in conjunction with the accompanying drawings wherein:

FIG. 1 which illustrates one simplified arrangement for frequency modulating a laser beam wherein the modulating apparatus is positioned within the laser cavity;

FIG. 2 shows a generally similar arrangement for achieving amplitude modulation; and FIG. 3 depicts performance curves corresponding to the various operating conditions of the above systems.

Referring now to FIG. 1 of the drawings, a light beam 10 produced by laser plasma tube 11 and linearly polarized in the plane of the paper is directed into a right angle prism 12 which is within the laser cavity. The direction of this beam is such that it makes an angle $\theta$ with the normal to the slant surface 13 of this prism. Positioned adjacent to this surface is an optical element 14 which is mounted on a piezo electric transducer 15 operating, for example, in a longitudinal vibration mode. This transducer, in turn, is supported by a suitable backing structure 16 so that when it is excited by an appropriate control signal, element 14 moves back and forth coming into and out of contact with the slant surface of the prism.

This general arrangement, as mentioned hereinbefore, is similar to that employed to amplitude modulate an optical beam. However, unlike the above case, here $n_f$, the index of refraction of the material forming the optical element is less than $n_p$, that of the prism. Additionally, the angle of incidence $\theta$ is such that $$\theta > \sin^{-1} \frac{n_f}{n_p}$$

and $$\theta > \sin^{-1} \frac{1}{n_p}.$$

When the optical element of the present invention is in contact with the slant surface of the prism, the optical beam under the above set of conditions does not, as in the case of the amplitude modulated arrangement, travel unimpeded through the interface but is, rather, totally internally reflected therefrom. Likewise, when this element is completely out of contact with the prism, the same behavior occurs.

When total internal reflection takes place from an interface, it is well known that the optical energy penetrates a finite distance $d$ into the second medium. This condition is illustrated by the dotted path shown in FIG. 1 and represents the particular situation where the second medium is air. When element 14 moves away from the position shown in FIG. 1 towards the prism, this optical path changes since a portion of it now takes place through this element with its different index of refraction. The effect of this change shows up in the phase of the emerging optical beam.

FIG. 3 shows the change in phase of the emerging beam as the angle of incidence $\theta$ increases above the critical angle $\theta_c$ when the second medium is air with refractive index of unity and when the second medium is element 14 with refractive index $n_f$. The operating point of the modulator is selected so that this angle is above the two critical angles for these interfaces at a location where substantially maximum phase difference occurs.

In order to achieve frequency modulation of the optical beam, element 14 need only be displaced through a relatively small air gap. The resulting cyclic TIR phase shift variations are equivalent to variations in laser cavity length. A modulation in laser output frequency is, therefore, produced. The actual physical displacement of element 14 need only be a fraction of the penetration depth associated with total internal reflection. Where $\theta$ is significantly above the critical angle for the prism-air interface, it may be on the order of $10^{-2}$ optical wavelengths.

Additionally, since the optical energy is neither absorbed by or transmitted through element 14, this member of the modulator may be of comparatively small size so as to permit its rapid displacement. Thus, large laser output frequency excursions may be achieved in relatively short time intervals.

With an appropriate selection of parameters, the above technique may be employed to frequency chirp the optical beam for laser-radar applications.

In the previous discussion, the optical beam 10 was polarized in a plane parallel to a plane of incidence, that is the plane of the paper, and the modulator was placed inside the laser cavity. However, if the beam is linearly polarized at 45° to this plane and the modulator is placed outside the laser cavity, the parallel and perpendicular polarization components will experience different phase shifts as a result of the internal reflection, and polarization modulation of the transmitted beam will be produced. FIG. 3 illustrates this external modulator arrangement. The relative phase changes of these two components when the second medium is air and when it is $n_f$ is similar to curves depicted in FIG. 3. The operating point, that is the angle of incidence, $\theta$, may be selected so that the phase shifts are such that the polarization varies from linear to circular during the modulation process. The system can either be used directly as a polarization modulator or can be made to operate as an amplitude modulator by positioning an appropriate optical polarizer such as 22 behind the totally reflecting prism.

What is claimed is:
1. Apparatus for frequency modulating a laser beam produced by a laser having a cavity of fixed dimensions comprising, in combination
   an optical prism positioned within said cavity in the path of said laser beam,
     the orientation of said prism and its index of refraction being such that said laser beam enters a first face of said prism, is incident on and experiences total internal reflection from a boundary surface of said prism when the medium in contact with this boundary surface is air and exits from a second face of said prism,
     said laser beam, while experiencing such reflection, emerging from said boundary surface and traversing an external path before re-entering said boundary surface; and
   means for altering the optical length of said external path thereby to change the phase of the laser beam exiting from said second face of said prism and the frequency of the laser beam leaving said cavity.

2. In an arrangement as defined in claim 1 wherein said means for altering the optical length of said external path includes
   an optical element located within said external path, said optical element having an index of refraction such that when said element is in contact with said boundary surface, said laser beam still experiences total internal reflection from said boundary surface.

3. In an arrangement as defined in claim 2 wherein said means for altering the optical length of said path further includes
   a transducer driving said optical element such that said element makes contact with said boundary surface and is cyclically displaced therefrom.

4. In an arrangement as defined in claim 1 wherein said optical prism is a right angle prism and said boundary surface corresponds to the longest face of said prism.

5. In an arrangement as defined in claim 1 wherein said laser beam is polarized in a direction that is parallel to the plane of incidence of said beam.

6. In an arrangement as defined in claim 1 wherein said means for altering the optical length of said external path includes an optical element positioned adjacent said boundary surface,
   said optical element having an index of refraction which is less than that of said prism; and means for altering the separation between said optical element and said boundary surface so that a varying portion of said external path occurs within said optical element.

7. Apparatus for frequency modulating a laser beam produced by a laser having a cavity of fixed dimensions, the combination of an optical prism positioned within said cavity in the path of the laser beam such that said laser beam enters one face of said prism and, thereafter, is incident on a boundary surface of said prism;

an optical element positioned adjacent said boundary surface; and means for moving said optical element such that said element comes in and out of contact with said boundary surface, the angle of incidence of the laser beam on said boundary surface, $\theta$, the index of refraction of said prism, $n_p$, and the index of refraction of said optical element, $n_f$, being such that sin $\theta$ is greater than $n_f/n_p$ and greater than $1/n_p$, whereby said laser beam experiences total internal reflection from said boundary surface when said optical element is both in and out of contact with said boundary surface;

the movement of said optical element changing the optical length of the external path of said laser beam associated with said total internal reflection and thereby changing the phase of the laser beam emerging from another face of said prism.

8. Apparatus for use with a laser cavity of fixed dimensions comprising, in combination an optical prism positioned outside of said cavity and in the path of the laser beam leaving said cavity, the orientation of said optical prism and its index of refraction being such that said laser beam enters a first face of said prism, is incident on and experiences total internal reflection from a boundary surface of said prism when the medium in contact with said boundary surface is air and exits from a second face of said prism, said laser beam before entering said first face of said prism being polarized at an angle of 45° with the plane of incidence, said laser beam, while experiencing total internal reflection, emerging from said boundary surface and traversing an external path before re-entering said boundary surface; and means for altering the optical length of said external path thereby to produce polarization modulation of the laser beam exiting from said second face of said prism.

9. In an arrangement as defined in claim 8 means positioned in the path of the laser beam exiting from said second face of said prism for converting said polarization modulated beam to an amplitude modulated beam.

* * * * *